(12) United States Patent
Matviychuk et al.

(10) Patent No.: US 9,555,376 B2
(45) Date of Patent: Jan. 31, 2017

(54) MULTILAYER, MICRO- AND NANOPOROUS MEMBRANES WITH CONTROLLED PORE SIZES FOR WATER SEPARATION AND METHOD OF MANUFACTURING THEREOF

(71) Applicant: Advance Materials Products, Inc. (ADMA Products, Inc.), Hudson, OH (US)

(72) Inventors: Mykhailo Matviychuk, Parma, OH (US); Volodymyr A. Duz, Hudson, OH (US); Vladimir S. Moxson, Hudson, OH (US)

(73) Assignee: ADMA Products, Inc., Hudson, OH (US)

( * ) Notice: Subject to any disclaimer, the term of this patent is extended or adjusted under 35 U.S.C. 154(b) by 561 days.

(21) Appl. No.: 13/751,085

(22) Filed: Jan. 26, 2013

(65) Prior Publication Data
US 2014/0209533 A1    Jul. 31, 2014

(51) Int. Cl.
| | | |
|---|---|---|
| *B01D 71/02* | (2006.01) | |
| *B22F 3/11* | (2006.01) | |
| *B01D 69/12* | (2006.01) | |
| *B01D 67/00* | (2006.01) | |
| *B01D 69/10* | (2006.01) | |
| *B01D 69/14* | (2006.01) | |
| *B22F 7/00* | (2006.01) | |

(52) U.S. Cl.
CPC ......... *B01D 71/028* (2013.01); *B01D 67/0041* (2013.01); *B01D 69/105* (2013.01); *B01D 69/12* (2013.01); *B01D 69/141* (2013.01); *B01D 71/022* (2013.01); *B01D 71/024* (2013.01); *B22F 3/11* (2013.01); *B22F 7/002* (2013.01); *B22F 2998/10* (2013.01)

(58) Field of Classification Search
CPC ......... B01D 29/44; B01D 29/46; B01D 37/02; B22F 1/00; B22F 1/0081; B22F 1/0085; B22F 1/0088; B22F 1/0096; B22F 1/02; B22F 1/025; B22F 3/00; B22F 3/001; B22F 3/008; B22F 3/10; B22F 3/1017; B22F 3/1035; B22F 3/1039; B22F 3/11; B22F 3/115; B22F 3/12; B22F 3/14; B22F 3/16; B22F 3/18; B22F 3/20; B22F 3/202; B22F 3/204; B22F 3/206; B22F 3/208; B22F 3/23; B22F 2003/1042; B22F 2003/1046; B22F 2003/185; B22F 2003/241; B22F 2003/245; B22F 2003/247; B22F 2003/248; B22F 5/006; B22F 7/00; B22F 7/002; B22F 7/008; B22F 9/00; B22F 9/001; B22F 9/002; B22F 9/02; B22F 9/16; B22F 2301/00; B22F 2301/20; B22F 2301/205; B22F 2303/00; B22F 2303/01; B22F 2303/05; B22F 2303/20; B22F 2303/35; B22F 2303/40; B22F 2303/405; B22F 2303/45; B22F 2304/00; B22F 2304/05; B22F 2304/054; B22F 2304/10; B22F 2304/10; B22F 2998/00; B22F 2998/10
USPC ...................................................... 210/490
See application file for complete search history.

(56) References Cited

U.S. PATENT DOCUMENTS

| | | |
|---|---|---|
| 4,383,923 A | 5/1983 | Elfert |
| 5,173,189 A | 12/1992 | Hoshi et al. |
| 5,208,190 A | 5/1993 | Anderson et al. |
| 6,638,336 B1 | 10/2003 | Drozdenko et al. |
| 7,175,801 B2 | 2/2007 | Rak et al. |
| 7,655,277 B2 | 2/2010 | Lee et al. |
| 8,007,562 B2 | 8/2011 | Kasparov et al. |
| 8,167,144 B2 | 5/2012 | Tanaka et al. |
| 2004/0110059 A1* | 6/2004 | Onishi ............................ 429/44 |
| 2010/0006496 A1 | 1/2010 | Tanaka et al. |
| 2010/0247944 A1* | 9/2010 | Mleczko ....................... 428/546 |
| 2011/0155662 A1 | 6/2011 | Liu et al. |

* cited by examiner

*Primary Examiner* — Allison Fitzsimmons

(57) ABSTRACT

The present invention relates to design and manufacture of multilayer sintered membranes made from metals and inorganic compounds (ceramics, silicate, clay, zeolites, phosphates, etc.). The membranes are designated for separation of water. They comprise at least one layer having nanopores commensurable with the size of water molecules. The membranes comprise: (a) supporting metallic layer having pore size 1-500 microns, (b) metallic interlayer having pore size <2 micron, (c) sublayer with local regular protrusions of the interlayer into the supporting layer to increase service life of the membrane, and (d) one nanoporous ceramic or metallic top layer having pore size in the range of 1-15 angstroms. The invented design and method allow the manufacture of cost-effective multilayer membranes containing nanoporous layer with controlled pore sizes in each layer and optimal morphology of pores that provides selective transport of molecules during filtration and separation of liquids.

17 Claims, No Drawings

MULTILAYER, MICRO- AND NANOPOROUS MEMBRANES WITH CONTROLLED PORE SIZES FOR WATER SEPARATION AND METHOD OF MANUFACTURING THEREOF

FIELD OF INVENTION

The present invention relates to the design and manufacture of multilayer sintered membranes made from metals and inorganic compounds such as ceramics, silicate and clay materials, zeolites, phosphates, and the like. The target membranes are designed for separation of water, therefore, they comprise at least one layer having nanopores commensurable with the size of water molecules. The resulting membranes have a wide spectra of applications, including, for instance, ethanol/water separation in ethanol fuel production, water removal from products of corn-to-ethanol conversion, natural gas dehydration, adsorption processes for moisture removal in residential and house dehumidifiers, any distillation and extraction processes for separation of water from hydrocarbons or solvents, water removal from a biomass, water generation from humid air, grey water purification.

The invented design and method allow the manufacturing of technically- and cost-effective multilayered membranes containing nanoporous layer with controlled pore sizes in each layer and optimal morphology of pores that provides selective transport of molecules during filtration and separation of liquids, high productivity of membranes in permeation of water molecules only while blocking all other molecules. There is no necessity to apply high pressure to the liquid flow because the water-separating layer on top or inside of our membranes is hydrophilic. Also, the invented multilayer, composite membranes have improved mechanical strength, resistance to brittle fracture, and improved corrosion resistance. The invented manufacturing processes involve usage of the hydrogenated metal powders with various hydrogen contents which allow tailoring the difference in shrinkage of the layers having distinct densities and particle sizes and removing the hydrogen during the final sintering operation.

DESCRIPTION OF RELATED ART

Various membranes are used for filtration and separation of water from organic, inorganic, and biological contaminations. These include metallic membranes, ceramic filters, membranes formed from porous metal or ceramic structures, and membranes formed from metal or ceramic fibers. Different design of membranes brings in another important factor of variation that aims to improve the effectiveness and strength of industrial membranes in different applications, as well as reduction of their costs.

In recent years, multilayer membranes manufactured from reactive porous metal layers, such as porous titanium layers, in combination with ceramic layers have been investigated for use in purifying water from gases, chemical contaminants, solid micro-particles, algae, pathogenic bacteria, etc. However, the desired grade of purified water by its separation from contaminating species on a molecular level was still not reached, or service life of existing multilayer membranes was not sufficient due to their brittleness, fouling, and high cost of powders, which make the known processes for manufacturing membranes very expensive.

At present time, only polymeric or ceramic membranes are mostly used in the manufacture of water-separating membranes having dispersed pores. Polymeric membranes such as U.S. Pat. No. 5,173,189 (1992) or U.S. Pat. No. 8,167,144 (2012) have the following disadvantages: low strength, low resistance to chemicals dissolved in water, sensitivity to organic solvents, problems with cleaning, short service life. Ceramic membranes such as titania-alumina-silica sintered membranes according to the U.S. Pat. No. 7,655,277 (2010) or microporous alumina ceramic membranes according to the U.S. Pat. No. 5,208,190 (1993) are brittle, therefore, the minimal thickness is limited, and thin ceramic membranes cannot be manufactured. Besides, ceramic membranes are not catalytically-active and cannot separate water from many organic species.

The manufacture of porous metal supports is disclosed by US Patent Application 2011/0155662 filed on Feb. 23, 2011. These metal supports are porous sheets comprising of Ni, Ni—Fe and Ni—Cu alloys, stainless steel, or titanium alloy powders. Average diameter of pores is ≤2 microns at the porosity 25-75%. The manufacture includes sintering in air, reduction of oxides, and sintering in hydrogen, followed by annealing for stress release. The method results in a porous structure containing metal oxide core particles coated by a metallic layer. The green sheet to be sintered is manufactured from a slurry of metal precursor, which contain a number of organic additives. All these compositions and operations together make the manufacture very complex and far from stability and properties control in the industrial conditions.

A porous titanium support used in multilayer membranes is known from U.S. Pat. No. 7,175,801 granted in 2007. Titanium hydride powder in the amount of up to 0.1 wt. % is added to prevent oxidation of titanium during service operation. Sintering of this titanium membrane is carried out at 1000° C. in vacuum and that makes a small amount of titanium hydride ineffective due to dissociation (dehydration) above 600° C. As a result, the variations in the shrinkages of the various layers create the cracking during sintering.

A semi-permeable, two-layer composite membranes consisting of a microporous substrate and a semi-permeable polymeric layer of urazoles are known from U.S. Pat. No. 4,383,923 granted in 1983. Polymer-based membranes can be used only in high-pressure systems that realize a "revers-osmos" concept. They are not effective for high-grade purification of water because zeolite nanoporous layer cannot be deposited onto the polymeric membrane substrates.

Another polymeric composite membrane is known from the US Patent Application 20100006496. This water separation membrane is composed of polypyrrole doped with a sulfonate ion. The sulfonate ion may be an aromatic or aliphatic sulfonate ion. Despite the sulfonate ion activate polymeric surfaces in membrane layers, this membranes exhibits the same drawback as all other polymer membranes: short service life, low strength, no nanoporous zeolite layer or other material layer, that is necessary for high-grade water separation.

Thus, a new concept for the design and materials of water-separating industrial membranes is needed. We offer this concept, which includes application of thin, multilayer micro-porous titanium membranes having dispersed pore size and inorganic nanoporous coating. Titanium support material additionally comprises a combination of titanium hydride and hydrogen-containing titanium solid solution. Sintered titanium membranes are corrosion resistant, strong, and light-weight. They can be easy cleaned by reversed water flow, and the pore size of sintered titanium membranes can vary in a wide range. The top hydrophilic inorganic layer performs a water molecules sieving function, while the porous titanium support prevents the fracture of this brittle top layer. Titanium hydride powder is manufactured according to U.S. Pat. No. 6,638,336 granted in 2003 and U.S. Pat. No. 8,007,562 granted in 2012.

New multilayer, hybrid titanium-inorganic membranes for water separation potentially have a wide field of applications from cleaning sea or river water from algae, silt, microorganisms, or organic species, to separation of biomass from water.

Due to high chemical stability of titanium, the new membranes manufactured upon our invention can be used in any environment, even in corrosion active liquids that should be cleaned from dispersed contaminants. Also, our membranes can be used at high temperatures and in the applications when the weight reduction of the systems and high corrosion resistance of membranes are required.

OBJECTIVES OF THE INVENTION

The objective of the invention is to manufacture thin, multilayer membranes effective for water separation from both inorganic and organic contaminants and providing reliable, long-term operation in various corrosive environments.

It is also an objective to provide a multilayer membrane structure with strength that is sufficient for the manufacture of large industrial membranes working under pressure and intensive flow of liquids to be cleaned.

Yet another objective of the invention is to improve adhesive strength between layers, especially to resist stresses that appear during the back flow of liquid through the membrane.

It is also an objective to provide the lowest possible mismatch in shrinkage layers during sintering by using the various hydrogenated powders.

Another objective related to the manufacture of membranes is to provide low shrinkage and minimum residual deformation of the membrane materials.

An additional objective is to reduce material and manufacturing costs achieved by using the low cost raw materials, low manufacturing cost, reduced scrap rate during producing the membrane systems and reduced cost of the systems associated with improved service life of the proposed membranes.

Finally, another objective is to use the membranes in the applications when weight reduction of the systems is required.

There remains a need to achieve a more effective self-cleaning of the membrane by the back flow of liquids.

The nature, utility, and further features of this invention will be more apparent from the following detailed description, with respect to the preferred embodiments of the invented technology.

SUMMARY OF THE INVENTION

Some or all of the needs described above can be met by the membrane design and methods described herein, and by the effective separation and cleaning of water that are the result of these methods. The above-mentioned objects of the invention are addressed by disclosed membrane structure and methods described here as embodiments of processes used for manufacturing multilayer, micro- and nano-porous membranes with controlled pore sizes for water separation.

A multilayer membranes comprises of the following components: (a) a porous supporting metallic layer having pore size in the range of 1-500 microns, (b) at least one porous metallic interlayer having pore size less than 1 micron, (c) a sublayer between the supporting metallic layer and interlayer with local regular protrusions of the interlayer into the supporting metallic layer in order to improve adhesive strength between these layers, which increases service life of the multilayer membrane because the adhesive strength is now higher than stresses that appear during the back flow of liquid through the membrane, and (d) at least one nanoporous ceramic or metallic top layer having pore size in the range of 1-15 angstroms. These different layers are produced with various densities and a particle size distribution and will have the various shrinkage characteristics. Also, hydrogen can be added to metal powders in these layers in order to control or limit shrinkage of each layer or reduce mismatch in shrinkage during sintering operation. At least one of the following, the supporting layer or the interlayer, comprises of both a hydrogen-containing titanium solid solution and titanium hydride $TiH_2$ particles, whereby the total hydrogen content in the interlayer is at least by 50% less than that in the supporting layer in order to provide lowest possible mismatch in shrinkage of both layers during sintering. Using the layers having various contents of hydrogen, we can control the relative shrinkage of each layer.

The micro-porous supporting layer is manufactured of materials selected from titanium, zirconium, niobium, their alloys, and hydrides, in any combinations, and their combination with ceramics and other non-metallic compounds, wherein all these components are in the form of powders having particle size in the range of 1-500 microns. The micro-porous interlayer is manufactured from the same materials as the supporting layer but all its components are in the form of powders having particle size in the range of 0.5-10 microns. Control of the particle size of any one mixed powder in both layers together with some steps of the disclosed process plays an important role in the flexible control of pore sizes in the resulting membrane.

One important distinction between two micro-porous layers is that metallic components of the interlayer are produced from at least partially-hydrogenated powders containing residual hydrogen in amount of 0.3-0.5 wt. % and having particle size in the range of 0.5-10 microns.

The method of manufacturing this multilayer structure provides controlled pore sizes for water separation and comprises of the following operational steps:
(a) manufacturing a porous supporting layer from metal powders selected from titanium, zirconium, niobium, and their alloys by at least one process selected from direct powder rolling, tape casting, and loose powder sintering at the temperature 700-1200° C., to provide pore sizes in the range of 1-500 microns;
(b) cleaning the metal particles during sintering of the supporting layer from residual oxygen by cyclic heating to 600-700° C. accompanied with hydrogenation-dehydrogenation processes of the porous support layer repeated at least two times to intensify diffusion processes during sintering;
(c) cold rolling of the supporting layer in as-sintered condition to reduce its thickness by 30-70% while controlling the thickness of the said supporting layer to provide tolerances within the range of ±0.0001 inch (±2.5 microns)) and surface roughness from N7 to N9 according to ISO 1302;
(d) hydrogenation of the supporting layer up to 3% wt. of hydrogen;
(e) manufacturing metal hydride powders selected from hydrides of titanium, zirconium, niobium, and alloys thereof having particle size from 0.5 to 10 microns at the average particle size about 2 microns by attrition or other means of said metal hydrides in alcohol or other liquids;

(f) partial dehydrogenation of obtained metal hydride powders in vacuum at the temperature about 350° C. to reach the content of residual hydrogen in the range of 0.3-0.5 wt. %;

(g) manufacturing the suspension by mixing partially-dehydrogenated metal hydride powders with isopropyl alcohol or other liquids in presence of ceramic ground bodies having diameter about 3 mm, whereby the volume ratio of alcohol or other liquids to the metal hydride powder is from about 1:10 to 1:15;

(h) coating this supporting layer with fine metallic powder having particle size from 0.5 to 10 microns with average particle size of about 2 microns using at least one process selected from powder spraying, impregnation from the suspension, painting, and tape casting of this powder in the form of a multilayer tape with at least two layers deposited over the sintered supporting layer, whereby both layers have different hydrogen content;

(i) sintering the coated support layer at 670-770° C. under a protective controlled atmosphere in order to form a double-layer structure comprising of the porous supporting layer bonded to the porous interlayer;

(j) re-rolling the sintered double-layer structure where the top layer comprises hydrogen-containing metal for optimization of pore morphology and sizes, and controlling the thickness of this double-layer structure in order to provide tolerances within the range of ±0.0001 inch (±2.5 microns), thickness reduction at least 5%, and surface roughness from N5 to N6 according to ISO 1302;

(k) annealing of the sintered and rolled multilayer membrane in the protective atmosphere at 500° C. to release micro-stresses, (l) coating with an inorganic compound nanoparticles over the interlayer with at least one of titanium, zirconium, niobium, and their alloys particles, their oxides, carbides, and combinations thereof providing the required nanopores having the size in the range of 1-15 angstroms, and (m) coating of the molecular sieve layer of coarse particles from titanium, zirconium, niobium, and their alloys for the purpose of preventing destruction of the molecular sieve layer.

At least one metal powder used for coating the support layer in step (g) to form the porous interlayer is manufactured by at least partial hydrogenation to contribute to its brittleness, and the hydrogenated powder is subjected to attrition or other size reduction processing in order to obtain the particle size in the range of 1-10 microns. On the other hand, the coating of the interlayer with zeolite nanoparticles in the step (l) is deposited by the crystal growing technique.

The double-layer and multilayer tape for manufacturing the support and the interlayer together in one processing step is made by tape-casting techniques from the metal hydride powder suspension using a multilevel doctor blade, followed by at least one process selected from cold, warm or hot rolling and sintering of the cast tape in vacuum and the combination of vacuum and hydrogen atmospheres. Suspensions for manufacture of cast tapes are prepared from the beginning in such a way that the supporting layer contains up to 5 wt. % of ceramic particles, while the interlayer contains up to 3 wt. % of ceramic particles.

Hydrogenation of the porous support layer in step (d) is carried out to up to 3% hydrogen content before depositing the interlayer in order to decrease difference in shrinkage between the support layer and the interlayer during subsequent sintering operations. This hydrogenation-dehydrogenation process of the porous support layer is repeated at least two times and includes heating in vacuum to 600-700° C., supplying hydrogen for 30 min, out-gassing to vacuum of $10^{-2}$ Torr, holding for dehydrogenation, then, supplying hydrogen again.

A water-selective zeolite powder in amount of 1-5 wt. % is added to the metal powder when preparing powder mixture for forming the interlayer in case of using a zeolite top layer as the water-separating layer of the membrane. This nanoporous thin layer plays the role of a molecule sieve for separation water molecules from molecules of contaminants.

In the resulting multilayer membrane structure control is exercised not only over pore sized but also over pore shapes. Two rolling operations provide pores having an ellipse-like morphology at the ratio of short axis A to long axis B in the range from A:B=1:1.5 to A:B=1:2.3 in order to improve the permeance of water molecules through the membrane.

DETAILED DESCRIPTION OF SPECIFIC EMBODIMENTS

The methods described herein can be more clearly understood by reference to the following description of specific embodiments and examples, which are intended to illustrate, rather than to limit, the scope of the appended claims.

As used herein, the terms "around" or "about" in connection with a numerical value denote a deviation from the numerical value of ±5%.

According to our invention, design of the multilayer membranes is represented by four layers having micro-pores and nanopores: (a) a supporting layer, (b) an interlayer, (c) a sublayer at the interface of the supporting layer, and (d) a water-separating top layer with or without an additional layer that is used to screen out large particulates. All these layers have different pore sizes, which are decreased in the direction from the supporting layer with micro-pores in the size range of 1-500 microns to the top layer with nanopores in the size range of 1-15 angstroms. As a matter of fact, the top layer plays a role of separating water molecules from any liquids flowing through the membrane, while the other three layers provide the necessary strength of the membrane and the preliminary cleaning of the liquid from any impurities and species larger in size than water molecules.

If the hydrogen-containing titanium solid solution component contains about 0.1 wt. % of hydrogen, then the titanium hydride component contains from 3.5 to 4 wt. % of hydrogen. When titanium powder in the supporting layer is substituted for zirconium or hafnium powders, the same principle of combining ductile Zr—H and/or Nb—H solid solution components with hard $ZrH_2$ and/or $NbH_2$ particles is also obeyed. All three titanium, zirconium, and hafnium reactive metal powders, as well as titanium-based, zirconium-based, and hafnium based alloys, can be used for manufacturing the supporting membrane layer as a mixture of any percentage combinations.

The structure of supportive layer comprises of a titanium component as well as a ceramic component, which is added by itself or partially substitutes for rigid metal hydride components. The ceramic components, such as alumina, silica, titanium carbide, titanium silicide, titanium diboride, zirconium carbide, hafnium carbide, silicon carbide, or mixture thereof are added in the form of powders having particle size in the range of 1-500 microns. Mostly the particle size of ceramics is the same as the particle size of metal or metal hydride components, but it can vary in a wide range to control the strength of membranes used in different applications. The rigid ceramic particles can be added in the support layer in amounts up to 5 wt. %.

The structure of interlayer is designed upon the same principles as the described-above structure of the supporting layer but using initial metal, hydride, and ceramic powders of much smaller sizes: in the range of 0.5-10 microns. Also interlayer can contain some amount of aluminosilicate crystals.

Pores in the supporting layer and interlayer have an ellipse-like morphology at the ratio of short axis A to long axis B in the range from A:B=1:1.5 to A:B=1:2.3 in order to improve the permeance of water molecules through the membrane. We found experimentally that this specific morphology of pores improves both flow capacity of the liquid to be cleaned through the multilayer membrane and self-cleaning ability of the membrane by back flow. The pore system is more developed and attractive for water separation because of changing hydraulic conditions in different directions of the flow in micro-channels. For instance, the water separation capacity of a multilayer membrane using for separating water from ethanol is 12% better at the ellipse-like morphology of pores having the ratio of AB=1:1.5.

The sublayer between the supporting metallic layer and interlayer improves adhesive strength between these layers and that increases service life of the multilayer membrane because the adhesive strength becomes greater than stresses that appear during back flow of liquid through the membrane. The sublayer is formed by local regular protrusions of the interlayer into the supporting metallic layer. The size of these local protrusions is in the range of 10-20 microns depending on the thicknesses and ductility of the supporting layer and the interlayer and on required strength of the multilayer membrane, as well. In one embodiment, when the supportive titanium layer 150 microns thick and the interlayer 40 microns thick are manufactured from 99 wt. % of C.P. titanium and 1 wt. % of alumina ceramic particles, the sublayer has thickness (the average protrusion sizes) of about 10 microns.

As described above, the methods disclosed herein relate generally to the manufacture of multilayer, microporous or nanoporous membranes with controlled pore sizes for water separation. The embodiments described herein are desirable because they provide a cost-effective method for manufacturing multilayer, water molecule-sieving membranes in the wide range of sizes and applications. These embodiments are so effective because the structural components of exemplary membranes and their processing aims to reach the most effective and reliable performance of the membranes in water separation.

Both the supporting layer and the interlayer of the membrane are manufactured from reactive metal powders such as titanium, zirconium, niobium and their alloys. Firstly, the supporting layer is manufactured from one of above-listed metal powders or their mixture in any combinations by at least one process selected from: direct powder rolling, tape casting, and loose powder sintering, followed by cold rolling of this supporting layer in as-sintered condition at the temperature above 800° C., to provide pore sizes in the range of 1-500 microns. In one embodiment, the supporting layer is made from C.P. titanium powder having the particle size from 45 to 160 microns by loose sintering, and vacuum sintering at 850° C. to reach pore sizes in the range of 1-120 microns. In another embodiment, the supporting layer is made from a blend of Ti-6Al-4V powder with an inorganic filler such as ammonium bicarbonate $NH_4HCO_3$. This powdered blend has particle size from 70 to 250 microns, and the supporting layer is manufactured from this blend by direct powder rolling, cold rolling, and vacuum sintering at 1100° C. to reach pore sizes in the range of 1-400 microns.

Then, cyclic heating to 600-700° C. in hydrogen atmosphere and vacuum accompanied with hydrogenation-dehydrogenation processes of the porous support layer is carried out two or three times to intensify diffusion processes during sintering and to clean metal powders in the supporting layer from residual oxygen. The oxygen-free supporting layer is subjected to the multi-run cold rolling in order to control the thickness of the said support layer and provide tolerances within the range of ±0.0001 inch (±2.5 microns)), thickness reduction of at least 5%, and surface roughness from N7 to N9 according to ISO 1302. For instance, the supporting layer made from C.P. titanium powder containing up to 0.01 wt. % of hydrogen is cold rolled four times at the thickness reduction of about 9% and surface roughness N7.

Surface roughness facilitates formation of micro-cracks during hardening and shrinkage of the coating, after the deposition of micro-powders. Therefore, the smaller is the surface roughness, the lower is the risk of cracking during the shrinkage of tape casting, powder slurry, etc. On the other hand, there is a problem of adhesion of the micro-powders (at the average particle size ~2 microns) with the solid surface at too low surface roughness. Therefore, the surface roughness is limited by the smallest roughness value which is still able to hold micro-powders. Apparently, the supporting layer has greater surface roughness than that of the interlayer, due to greater size of particles deposited onto the supporting layer in comparison with the interlayer, which has to hold nanopowders. We found experimentally that the surface roughness N7 of the ISO 1302 scale is sufficient to adhere and accumulate micro-powders on the surface of the supporting layer, while N5 is sufficient for nanopowders on the surface of the interlayer.

Hydrogenation of the porous support layer to up to 3% hydrogen content is carried out before depositing the interlayer in order to decrease difference in shrinkage between the supporting layer and the interlayer during subsequent sintering operations.

Metal hydride powders are manufactured separately by attrition and classification of metal hydrides selected from titanium, zirconium, niobium hydrides to reach particle size from 0.5 to 10 microns at the average particle size about 2 microns. The attrition or other size-reduction processes is carried out in alcohol or other liquid to protect the powders from oxidation. The resulting metal hydride powders are subjected to partial dehydrogenation in vacuum at the temperature about 350° C. to reach the content of residual hydrogen in the range of 0.3-0.5 wt. %. In one embodiment, the titanium fine powder contains about 0.35 wt. % of hydrogen, while the zirconium fine powder, in another embodiment, contains about 0.45 wt. % of hydrogen. The obtained partially-dehydrogenated metal powders are mixed with isopropyl alcohol to prepare a "sour cream-like" viscous suspension. Mixing is carried out in the presence of ceramic ground bodies having diameter about 3 mm. The volume ratio of isopropyl alcohol to the metal hydride powder is about 1:10 for fine C.P. titanium powder, or about 1:15 for fine zirconium powder.

The fine metal powder prepared in such a way is deposited on top of the said supporting layer in order to form the interlayer. The coating is manufactured by using at least one process selected from powder spraying, impregnation from the suspension, or painting and tape casting of this powder in the form of a multilayer tape with at least two layers deposited over the sintered supporting layer. Tape casting is preferable to process fine titanium or zirconium powders deposited on top of the supporting layer. Then, the coated supporting layer is sintered at 670-770° C. in vacuum or under protective, controlled atmosphere, e.g., dry argon, in order to form a double-layer membrane structure comprising the porous supporting layer bonded to the porous interlayer. In one embodiment, when the deposited interlayer comprises of hydrogen-alloyed C.P. titanium the sintering temperature is about 670° C. In another embodiment, when the deposited interlayer comprises of hydrogen-alloyed C.P. zirconium powders the sintering temperature is about 770° C. Both structural layers of the membrane are diffusion-bonded with each other as a result of this step of the manufacturing process. Hydrogenation-dehydrogenation process of the porous support layer is repeated at least two times and includes heating in vacuum to 600-700° C., supplying hydrogen for 30 min, out-gassing to vacuum $10^{-2}$ Torr, holding for dehydrogenation, and then, supplying hydrogen again.

The preferable procedure of manufacturing the multilayer structure of supporting layer and interlayer is tape casting techniques using the metal hydride powder suspension as a raw material and using a multilevel doctor blade, followed by at least one process selected from cold, warm or hot rolling and sintering of the cast tape in vacuum and the combination of vacuum and hydrogen atmospheres. Application of a multilevel doctor blade provides high accuracy in thickness tolerances, as well as low and stable surface roughness of the membrane layers.

The next operation is re-rolling the sintered double-layer structure and controlling the thickness of this double-layer structure in order to provide tolerances within the range of ±0.0001 inch (±2.5 microns), thickness reduction of at least 5%, and surface roughness from N5 to N6 according to ISO 1302. This is an important process step that is responsible for final pore sizes and morphology of pores. The above mentioned structural sublayer of the membrane is formed during this step, too. This sublayer provides improved adhesion of the interlayer to the supporting layer due to multiple local protrusion of one layer into another.

Either the micro-porous supporting layer, or micro-porous interlayer, or both layers can be made by blended elemental approach with the addition of a filler as a pore-former. The blended elemental approach facilitates the technology and provides reduction of production costs. This approach includes mixing individual powders and forming the alloy by sintering instead of the preparation and use of an expensive pre-alloyed powder for manufacturing any one membrane layer. The pore-forming filler is selected from chlorides, bicarbonates, and the like, e.g., sodium chloride NaCl or ammonium bicarbonate $NH_4HCO_3$.

Annealing of a sintered and rolled multilayer membrane in a protective atmosphere at 500° C. is used to release micro-stresses and reduce oxide films in open pores of the membrane. The annealing is carried out for 2-3 hours depending on porosity and the size of the membrane. The greater is the size of the membrane and the smaller are pore sizes, the longer is heat treatment in hydrogen.

The final step of the process is coating with an inorganic compound nanoparticles over the interlayer such as titanium, zirconium, niobium, and their alloys particles, their oxides, carbides, and combinations thereof providing required nanopores having the size in the range of 1-15 angstroms. The function of this nanoporous layer, in fact, is the separation of water molecules from any liquids flowing through the membrane. This layer is thin if compare with the supporting layer or the interlayer. In one embodiment, the thickness of nanoporous layer is about 2 microns, in another embodiment, it is about 4 microns. Its small thickness improves productivity of the membrane due to superior conditions for permeance of water. Also, the coating of the top layer with zeolite nanopowder is deposited by the crystal growing technique.

The foregoing examples of the invention are illustrative and explanatory. The examples are not intended to be exhaustive and serve only to show the possibilities of the technology disclosed herein.

Example 1

A Multilayer Membrane for Separation of Water from Air

Multilayer membranes having micro-pores and nanopores in different layers were manufactured for separation of water from air. The membranes comprised of the following components:
(a) a micro-porous supporting titanium layer having pore size in the range of 1-120 microns, where the thickness of CP-titanium supporting layer is about 50 microns,
(b) a micro-porous interlayer 15 microns thick made from titanium having pore size in the range of 0.3-1 microns,
(c) a sublayer about 10 microns thick between the supporting layer and the interlayer with local regular protrusions of the interlayer into the supporting layer in order to improve adhesive strength between these layers, and
(d) a nanoporous aluminosilicate (zeolite) layer having pore size in the range of 1-4 angstroms, where the thickness of this layer is about 2 microns.

Pores in the supporting layer and the interlayer have an ellipse-like morphology at the ratio of short axis A to long axis B in the range from A:B=1:1.5 to A:B=1:2.3 in order to improve the permeance of water molecules through the membrane. The top zeolite layer works as a water separation layer.

Example 2

A Multilayer Membrane for Separation of Water from Water Containing Solvents

Multilayer membranes having micro-pores and nanopores in different layers were manufactured for separation of water from alcohols and solvents such as isopropyl, butyl, ethanol. The membranes comprised of the following components:
(a) a micro-porous supporting titanium layer having pore size in the range of 1-300 microns, where the thickness of supporting layer is 100±10 microns and it comprises of 95-99 wt. % titanium and 1-5 wt. % of ceramics particles,
(b) a micro-porous interlayer made from titanium having pore sizes in the range of 0.3-1.0 microns, where the thickness of the titanium interlayer is 35 microns and it comprises of 95-99 wt. % titanium and 1-5 wt. % of ceramics particles,
(c) a sublayer about 10 microns thickness between the supporting layer and the interlayer with local regular protrusions of the interlayer into the supporting layer in order to improve adhesive strength between these layers, and (d) a nanoporous aluminosilicate (zeolite) layer having pore size in the range of 1-4 angstroms, where the thickness of this layer is 0.2 microns.

Pores in the supporting layer and the interlayer have an ellipse-like morphology at the ratio of short axis A to long axis B in the range from A:B=1:1.5 to A:B=1:2.3 in order to improve the permeance of water molecules through the membrane. Ceramics particles increase the rigidity and strength of the support layers and interlayers. In this example, both the supporting layers and the interlayers had higher strength than that of the membranes in Example 1. The zeolite layer worked as water separation layer.

Example 3

A Multilayer Membrane for Treatment of Output Water and Algae/Microalgae Dewatering in Biofuel Production Multilayer membranes having micro-pores and nanopores in different layers were manufactured for separation of water from Algae/Microalgae species. Each membrane comprised of the following components:
  (a) a micro-porous supporting titanium layer 150 microns thick having pore size in the range of 1-500 microns and comprising of 95-99 wt. % titanium and 1-5 wt. % of ceramics particles,
  (b) a micro-porous interlayer made from titanium 45 microns thick having pore size in the range of 0.3-1 microns and comprising of 95-99 wt. % titanium and 1-5 wt. % of ceramics particles,
  (c) a sublayer about 10 microns thick between the supporting layer and the interlayer with local regular protrusions of the interlayer into the supporting layer in order to improve adhesive strength between these layers,
  (d) a nanoporous ceramic layer 2 microns having pore size in the range of 1-14 angstroms, and
  (e) a micro-porous pre-filtration layer 10 microns thick having pore size in the range of 1-100 microns and comprising of 95-99 wt. % titanium and 1-5 wt. % of ceramics particles.

Pores in the supporting layer and the interlayer have an ellipse-like morphology at the ratio of short axis A to long axis B in the range from A:B=1:1.5 to A:B=1:2.3 in order to improve the permeance of water molecules through the membrane. Ceramics particles increase rigidity and strength of layers. In this example, both the supporting layer and the interlayer had higher strength than that of the membrane in Example 1. The ceramic layer worked as a water separation layer.

Example 4

A Multilayer Membrane for Desalination of Water

Multilayer membranes having micro-pores and nanopores in different layers were manufactured for desalination of water. Each membrane comprised of the following components:
  (a) a micro-porous supporting titanium layer 120±20 microns thick having pore size in the range of 1-500 microns and comprising of 95-99 wt. % zirconium and 1-5 wt. % of ceramics particles,
  (b) a micro-porous interlayer 30 microns thick made from titanium having pore size in the range of 0.3-1 microns and comprising of 95-99 wt. % zirconium and 1-5 wt. % of ceramics particles,
  (c) a sublayer about 10 microns thick between the supporting layer and the interlayer with local regular protrusions of the interlayer into the supporting layer in order to improve adhesive strength between these layers, and
  (d) a nanoporous ceramic layer 2 microns thick having pore size in the range of 1-5 angstroms.

Pores in the supporting layer and the interlayer have an ellipse-like morphology at the ratio of short axis A to long axis B in the range from A:B=1:1.5 to A:B=1:2.3 in order to improve the permeance of water molecules through the membrane. Ceramics particles increase rigidity and strength of supporting layers and interlayers. In this example, both the supporting layers and the interlayers had higher strength than those of the membranes in Example 1. The ceramic layer worked as a water separation layer.

Example 5

A Process of Manufacturing a Multilayer Membrane for Separation Water from Air

A porous supportive layer is manufactured from C.P. titanium powder −325 mesh by loose sintering. The loose powder was applied onto a graphite plate in the form of thin layer that was leveled uniformly. First, sintering was done in vacuum and hydrogen with the following steps: (1) heating in vacuum to 600° C., (2) purging hydrogen and holding 1 h, (3) outgassing the furnace chamber and heating to 850° C. in vacuum, (4) holding 3 h and cooling.

Then, cold rolling was carried out to reduce the thickness of sintered, porous titanium plate by 45% down to 50 microns (see Example 1). The resulting surface roughness according to ISO 1302 was N7 at tolerances ±2.5 microns. Hydrogenation of the supporting layer were carried out in the same vacuum furnace purged with hydrogen at 700° C. for 1 h, followed by slow cooling. The amount of Hydrogen in the hydrogenated support layer is 2.5%

Titanium hydride $TiH_2$ powder having average particle size of about 2 microns was prepared by attrition in isopropyl alcohol. This fine powder was partially dehydrogenated at 350° C. in vacuum. The content of residual hydrogen was about 0.3 wt. %. This powder was subjected during preparation to a suspension with isopropyl alcohol at the weight ratio of powder to alcohol 12.5:1. In order to manufacture the interlayer on top of the supporting layer, the latter was coated with the prepared powder to form a layer about 2 microns thick by impregnation from the suspension.

Sintering of the two-layer membrane structure was carried out at 670° C. in vacuum. Having layers with varying hydrogen content allows us to control the differential in shrinkages of each layer. As a result, contraction of both layers during sintering was adjusted and controlled, and deformation of the membrane during sintering was prevented. The sintered two-layers membrane was subjected to slight re-rolling in order to improve surface roughness to N5 according to ISO 1302 and reduce the thickness by about 5%. Then, annealing in vacuum or protective atmosphere was done at 500° C. for 1 h to release micro-stresses, and simultaneously, to clean the membrane surface after rolling.

Resulting two-layers porous titanium membranes with smooth surface were placed into the autoclave with water-solution of sodium aluminate and sodium metasilicate, where a top nanoporous layer of zeolite 4A was manufactured by holding at 80° C. for 8-14 h. This zeolite 4A layer had thickness of about 2 microns with the average pore size of about 4 angstroms.

We claim:

1. A multilayer, micro- and nanoporous membrane with controlled pore sizes for water separation comprising:
   (a) a porous supporting metallic layer having pore size in the range of 1-500 microns,
   (b) at least one porous metallic interlayer having pore size less than 1 micron,
   (c) a sublayer between the porous supporting metallic layer and the porous metallic interlayer with local regular protrusions of the porous metallic interlayer into the porous supporting metallic layer, which improves adhesive strength between these layers, wherein service life of the multilayer membrane is increased because the adhesive strength is greater than stresses that occur during back flow of liquid through the membrane, and
   (d) at least one nanoporous ceramic or metallic or aluminosilicate layer having pore size in the range of 1-15 angstroms, disposed over the porous metallic interlayer;
wherein pores in the porous supporting metallic layer and the porous metallic interlayer have an ellipse-like morphology at the ratio of a short axis A to a long axis B in the range from A:B=1:1.5 to A:B=1:2.3, wherein the multilayer, micro- and nanoporous membrane is manufactured by a method comprising:
   (a) manufacturing a porous supporting metallic layer from metal powders selected from titanium, zirconium, niobium, and their alloys, by at least one process selected from the group consisting of direct powder rolling, cold rolling, and tape casting, followed by vacuum sintering, or loose powder sintering at the temperature 700-1000° C., to provide pore sizes in the range of 1-500 microns;
   (b) cleaning the metal powders during the vacuum or loose powder sintering of the porous supporting metallic layer of residual oxygen by cyclic heating of the porous supporting metallic layer to 600-700° C. accompanied by a hydrogenation-dehydrogenation process of the porous supporting metallic layer that is repeated at least two times;
   (c) cold rolling of the sintered porous supporting metallic layer to reduce its thickness by 30-70% while maintaining the thickness of said porous supporting metallic layer to provide tolerances in thickness within a range of ±0.0001 inch (±2.5 microns) and surface roughness to N7 to N9 according to ISO 1302;
   (d) hydrogenating the sintered porous supporting metallic layer to a hydrogen content of up to 3% wt. of hydrogen;
   (e) manufacturing fine metal hydride powders, selected from the group consisting of hydrides of titanium, zirconium, niobium, and alloys thereof, having particle size from 0.5-10 microns, with an average particle size of about 2 microns, by attrition of said metal hydrides in alcohol;
   (f) partially dehydrogenating the obtained metal hydride powders in vacuum at a temperature of about 350° C. to reach a content of residual hydrogen in the range of 0.3-0.5 wt. %;
   (g) manufacturing a suspension by mixing the partially-dehydrogenated metal hydride powders with isopropyl alcohol in the presence of ceramic ground bodies having diameter of about 3 mm, wherein the volume ratio of alcohol to the partially-dehydrogenated metal hydride powder is about from 1:10 to 1:15;
   (h) coating the porous supporting metallic layer with partially-dehydrogenated metal hydride powder having a particle size from 0.5-10 microns with an average particle size of about 2 microns using at least one process selected from the group consisting of powder spraying of the suspension, impregnation from the suspension, painting of the suspension, and tape casting of this powder in the form of a multilayer tape with at least two layers deposited over the sintered porous supporting metallic layer, thereby forming a porous metallic interlayer and a sublayer between the porous supporting metallic layer and the porous metallic interlayer;
   (i) sintering the coated porous supporting metallic layer at a temperature of 570-870° C. under a protective controlled atmosphere, and forming a structure comprising the porous supporting metallic layer bonded to the porous metallic interlayer;
   (j) re-rolling the sintered structure for optimization of pore morphology and sizes and maintaining the thickness of this structure in order to provide tolerances within the range of ±0.0001 inch (±2.5 microns), thickness reduction of at least 5%, and surface roughness from N5 to N6 according to ISO 1302,
   (k) annealing of the sintered and re-rolled multilayer membrane in a vacuum or a protective atmosphere at 500° C. to release micro-stresses;
   (l) coating inorganic compound nanoparticles over the interlayer wherein the inorganic compound nanoparticles comprise at least one of the following, titanium, zirconium, niobium, and their alloys, their oxides, carbides, and combinations thereof, wherein at least one nanoporous layer having nanopores in the size range of 1-15 angstroms is formed, and
   (m) optionally coating the nanoporous layer with coarse particles selected from the group consisting of titanium, zirconium, niobium, and their alloys.

2. A method of manufacturing multilayer, micro- and nanoporous membranes with controlled pore sizes for water separation comprising:
   (a) manufacturing a porous supporting metallic layer from metal powders selected from titanium, zirconium, niobium, and their alloys, by at least one process selected from the group consisting of direct powder rolling, cold rolling, and tape casting, followed by vacuum sintering, or loose powder sintering at the temperature 700-1000° C., to provide pore sizes in the range of 1-500 microns;
   (b) cleaning the metal powders during the vacuum or loose powder sintering of the porous supporting metallic layer of residual oxygen by cyclic heating of the porous supporting metallic layer to 600-700° C. accompanied by a hydrogenation-dehydrogenation process of the porous supporting metallic layer that is repeated at least two times;
   (c) cold rolling of the sintered porous supporting metallic layer to reduce its thickness by 30-70% while maintaining the thickness of said porous supporting metallic layer to provide tolerances in thickness within a range of ±0.0001 inch (±2.5 microns) and surface roughness to N7 to N9 according to ISO 1302;
   (d) hydrogenating the sintered porous supporting metallic layer to a hydrogen content of up to 3% wt. of hydrogen;
   (e) manufacturing fine metal hydride powders, selected from the group consisting of hydrides of titanium, zirconium, niobium, and alloys thereof, having particle size from 0.5-10 microns, with an average particle size of about 2 microns, by attrition of said metal hydrides in alcohol;

(f) partially dehydrogenating the obtained metal hydride powders in vacuum at a temperature of about 350° C. to reach a content of residual hydrogen in the range of 0.3-0.5 wt. %;

(g) manufacturing a suspension by mixing the partially-dehydrogenated metal hydride powders with isopropyl alcohol in the presence of ceramic ground bodies having diameter of about 3 mm, wherein the volume ratio of alcohol to the partially-dehydrogenated metal hydride powder is about from 1:10 to 1:15;

(h) coating the porous supporting metallic layer with partially-dehydrogenated metal hydride powder having a particle size from 0.5-10 microns with an average particle size of about 2 microns using at least one process selected from the group consisting of powder spraying of the suspension, impregnation from the suspension, painting of the suspension, and tape casting of this powder in the form of a multilayer tape with at least two layers deposited over the sintered porous supporting metallic layer, thereby forming a porous metallic interlayer and a sublayer between the porous supporting metallic layer and the porous metallic interlayer;

(i) sintering the coated porous supporting metallic layer at a temperature of 570-870° C. under a protective controlled atmosphere, and forming a structure comprising the porous supporting metallic layer bonded to the porous metallic interlayer;

(j) re-rolling the sintered structure for optimization of pore morphology and sizes and maintaining the thickness of this structure in order to provide tolerances within the range of ±0.0001 inch (±2.5 microns), thickness reduction of at least 5%, and surface roughness from N5 to N6 according to ISO 1302;

(k) annealing of the sintered and re-rolled multilayer membrane in a vacuum or a protective atmosphere at 500° C. to release micro-stresses;

(l) coating inorganic compound nanoparticles over the interlayer wherein the inorganic compound nanoparticles comprise at least one of the following, titanium, zirconium, niobium, and their alloys, their oxides, carbides, and combinations thereof, wherein at least one nanoporous layer having nanopores in the size range of 1-15 angstroms is formed, and (m) optionally coating the nanoporous layer with coarse particles selected from the group consisting of titanium, zirconium, niobium, and their alloys.

3. The multilayer, micro- and nanoporous membrane with controlled pore sizes for water separation according to claim 1, wherein the porous supporting layer is manufactured of materials selected from the group consisting of titanium, zirconium, niobium, their alloys, hydrides, carbides, oxides, and silicides in any combinations, and their combination with ceramics and other non-metallic compounds, wherein all these components are in the form of powders having particle size in the range of 1-500 microns.

4. The multilayer, micro- and nanoporous membrane with controlled pore sizes for water separation according to claim 1, wherein the porous interlayer is manufactured of materials selected from the group consisting of titanium, zirconium, niobium, their alloys and hydrides in any combinations, and their combination with ceramics and other non-metallic compounds, wherein all these components are in the form of powders having particle size in the range of 0.5-10 microns.

5. The multilayer, micro- and nanoporous membrane with controlled pore sizes for water separation according to claim 4, wherein the components manufactured from titanium, zirconium, niobium, their alloys and hydrides in any combinations, are in the form of at least partially-hydrogenated powders containing residual hydrogen in the amount of 0.3-0.5 wt. % and having particle size in the range of 0.5-10 microns.

6. The method of manufacturing a multilayer, micro- and nanoporous membrane with controlled pore sizes for water separation according to claim 2, wherein the partially-dehydrogenated metal hydride powder, used for coating the porous supporting metallic layer to form the porous metallic interlayer, is manufactured by at least partial hydrogenation to control brittleness of the powder; and the hydrogenated powder is subjected to attrition or other size reduction processing in order to obtain the particle size in the range of 0.5-10 microns.

7. The method of manufacturing a multilayer, micro- and nanoporous membrane with controlled pore sizes for water separation according to claim 2, wherein the coating of the porous supporting metallic layer with the partially-dehydrogenated metal hydride powder comprises tape casting techniques using the metal hydride powder suspension as raw material and using a multilevel doctor blade, followed by at least one process selected from the group consisting of: warm rolling, sintering of the cast tape in vacuum, and the combination of vacuum and hydrogen atmospheres.

8. The method of manufacturing a multilayer, micro- and nanoporous membrane with controlled pore sizes for water separation according to claim 2, wherein the coating with inorganic compound nanoparticles is done by deposition via crystal growing.

9. The multilayer, micro- and nanoporous membrane with controlled pore sizes for water separation according to claim 2, wherein at least one of the porous supporting metallic layer and the porous metallic interlayer, are made by a process further comprising the addition of a filler as a pore-former.

10. The multilayer, micro- and nanoporous membrane with controlled pore sizes for water separation according to claim 1, wherein the porous supporting metallic layer contains up to 5 wt. % of ceramic particles, and wherein the porous metallic interlayer contains up to 3 wt. % of ceramic particles.

11. The method of manufacturing a multilayer, micro- and nanoporous membrane with controlled pore sizes for water separation according to claim 2, wherein the hydrogenation of the porous supporting metallic layer to a hydrogen content of up to about 3% hydrogen content is carried out before depositing the porous metallic interlayer in order to decrease difference in shrinkage between the porous supporting metallic layer and the porous metallic interlayer during subsequent sintering operations.

12. The method of manufacturing a multilayer, micro- and nanoporous membrane with controlled pore sizes for water separation according to claim 2, wherein the hydrogenation-dehydrogenation process of the porous supporting metallic layer is repeated at least two times and comprises heating in vacuum to 600-700° C., supplying hydrogen for 30 min, out-gassing to vacuum $10^{-2}$ Torr, holding for dehydrogenation, and then, supplying hydrogen again.

13. The method for manufacturing a multilayer, micro- and nanoporous membrane with controlled pore sizes for water separation according to claim 2, further comprising adding 1-5 wt. %, based on the weight of the metal powders, of zeolite powder to the metal powders when preparing the powder mixture for forming the porous supporting metallic interlayer.

14. The method for manufacturing a multilayer, micro- and nanoporous membrane with controlled pore sizes for water separation according to claim 2, further comprising adding 1-5 wt. %, based on the weight of the metal powders, of particles of at least one of titanium, zirconium, niobium, and their alloys, their oxides, carbides, and combinations, to the metal powder when preparing the powder mixture for forming the porous supporting metallic layer and the porous metallic interlayer.

15. The method for manufacturing a multilayer, micro- and nanoporous membrane with controlled pore sizes for water separation according to claim 2, wherein the pores have an ellipse-like morphology at the ratio of a short axis A to a long axis B in the range from A:B=1:1.5 to A:B=1:2.3.

16. The multilayer, micro- and nanoporous membranes with controlled pore sizes for water separation according to claim 1, further comprising an additional pre-filtration microporous layer on top of the nanoporous ceramic or metallic or aluminosilicate layer to screen out large particulates.

17. A multilayer, micro- and nanoporous membrane with controlled pore sizes for water separation comprising:
   (a) a porous supporting metallic layer having pore size in the range of 1-500 microns,
   (b) at least one porous metallic interlayer having pore size less than 1 micron,
   (c) a sublayer between the porous supporting metallic layer and the porous metallic interlayer with local regular protrusions of the porous metallic interlayer into the porous supporting metallic layer, which improves adhesive strength between these layers, wherein service life of the multilayer membrane is increased because the adhesive strength is greater than stresses that occur during back flow of liquid through the membrane, and
   (d) at least one nanoporous ceramic or metallic or aluminosilicate layer having pore size in the range of 1-15 angstroms, disposed over the porous metallic interlayer;
wherein pores in the porous supporting metallic layer and the porous metallic interlayer have an ellipse-like morphology at the ratio of a short axis A to a long axis B in the range from A:B=1:1.5 to A:B=1:2.3;
wherein the membrane is produced according to a method comprising the steps of:
   (a) manufacturing a porous supporting metallic layer from metal powders selected from titanium, zirconium, niobium, and their alloys, by at least one process selected from the group consisting of direct powder rolling, cold rolling, and tape casting, followed by vacuum sintering, or loose powder sintering at the temperature 700-1000° C., to provide pore sizes in the range of 1-500 microns;
   (b) cleaning the metal powders during the vacuum or loose powder sintering of the porous supporting metallic layer of residual oxygen by cyclic heating of the porous supporting metallic layer to 600-700° C. accompanied by a hydrogenation-dehydrogenation process of the porous supporting metallic layer that is repeated at least two times;
   (c) cold rolling of the sintered porous supporting metallic layer to reduce its thickness by 30-70% while maintaining the thickness of said porous supporting metallic layer to provide tolerances in thickness within a range of ±0.0001 inch (±2.5 microns) and surface roughness to N7 to N9 according to ISO 1302;
   (d) hydrogenating the sintered porous supporting metallic layer to a hydrogen content of up to 3% wt. of hydrogen;
   (e) manufacturing fine metal hydride powders, selected from the group consisting of hydrides of titanium, zirconium, niobium, and alloys thereof, having particle size from 0.5-10 microns, with an average particle size of about 2 microns, by attrition of said metal hydrides in alcohol;
   (f) partially dehydrogenating the obtained metal hydride powders in vacuum at a temperature of about 350° C. to reach a content of residual hydrogen in the range of 0.3-0.5 wt. %;
   (g) manufacturing a suspension by mixing the partially-dehydrogenated metal hydride powders with isopropyl alcohol in the presence of ceramic ground bodies having diameter of about 3 mm, wherein the volume ratio of alcohol to the partially-dehydrogenated metal hydride powder is about from 1:10 to 1:15;
   (h) coating the porous supporting metallic layer with partially-dehydrogenated metal hydride powder having a particle size from 0.5-10 microns with an average particle size of about 2 microns using at least one process selected from the group consisting of powder spraying of the suspension, impregnation from the suspension, painting of the suspension, and tape casting of this powder in the form of a multilayer tape with at least two layers deposited over the sintered porous supporting metallic layer, thereby forming a porous metallic interlayer and a sublayer between the porous supporting metallic layer and the porous metallic interlayer;
   (i) sintering the coated porous supporting metallic layer at a temperature of 570-870° C. under a protective controlled atmosphere, and forming a structure comprising the porous supporting metallic layer bonded to the porous metallic interlayer;
   (j) re-rolling the sintered structure for optimization of pore morphology and sizes and maintaining the thickness of this structure in order to provide tolerances within the range of ±0.0001 inch (±2.5 microns), thickness reduction of at least 5%, and surface roughness from N5 to N6 according to ISO 1302;
   (k) annealing of the sintered and re-rolled multilayer membrane in a vacuum or a protective atmosphere at 500° C. to release micro-stresses;
   (l) coating inorganic compound nanoparticles over the interlayer wherein the inorganic compound nanoparticles comprise at least one of the following, titanium, zirconium, niobium, and their alloys, their oxides, carbides, and combinations thereof, wherein at least one nanoporous layer having nanopores in the size range of 1-15 angstroms is formed, and
   (m) optionally coating the nanoporous layer with coarse particles selected from the group consisting of titanium, zirconium, niobium, and their alloys.

* * * * *